(12) United States Patent
Yamamoto

(10) Patent No.: US 9,776,617 B2
(45) Date of Patent: Oct. 3, 2017

(54) HYBRID VEHICLE

(71) Applicant: Toyota Jidosha Kabushiki Kaisha, Toyota-shi, Aichi-ken (JP)

(72) Inventor: Masaya Yamamoto, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/797,642

(22) Filed: Jul. 13, 2015

(65) Prior Publication Data

US 2016/0023648 A1    Jan. 28, 2016

(30) Foreign Application Priority Data

Jul. 22, 2014   (JP) ................................. 2014-148931

(51) Int. Cl.

| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/10* | (2016.01) |
| *B60W 10/06* | (2006.01) |
| *B60W 10/08* | (2006.01) |
| *B60W 30/20* | (2006.01) |

(Continued)

(52) U.S. Cl.
CPC ............... *B60W 20/10* (2013.01); *B60K 6/36* (2013.01); *B60K 6/365* (2013.01); *B60K 6/445* (2013.01); *B60K 6/54* (2013.01); *B60K 6/547* (2013.01); *B60W 10/06* (2013.01); *B60W 10/08* (2013.01); *B60W 10/10* (2013.01); *B60W 20/30* (2013.01); *B60W 30/20* (2013.01); *F16H 3/66* (2013.01); *F16H 3/727* (2013.01); *B60W 2510/1005* (2013.01); *B60W 2710/0644* (2013.01); *B60W 2710/083* (2013.01); *B60W 2710/1005* (2013.01); *B60Y 2200/92* (2013.01); *B60Y 2300/188* (2013.01); *B60Y 2300/20* (2013.01); *F16H 2200/0043* (2013.01); *F16H 2200/201* (2013.01); *F16H 2200/2007* (2013.01); *F16H 2200/2043* (2013.01); *F16H 2200/2066* (2013.01); *Y02T 10/6239* (2013.01); *Y10S 903/917* (2013.01); *Y10S 903/93* (2013.01)

(58) Field of Classification Search
CPC ........... B60W 20/10; G06F 17/00; B60K 1/00
USPC ........................................ 701/22, 54; 290/40
See application file for complete search history.

(56) References Cited

U.S. PATENT DOCUMENTS

| | | | |
|---|---|---|---|
| 2001/0020789 A1* | 9/2001 | Nakashima ............ | B60K 6/365 |
| | | | 290/40 C |
| 2008/0228363 A1* | 9/2008 | Kouno ..................... | B60K 6/48 |
| | | | 701/54 |

FOREIGN PATENT DOCUMENTS

JP        2009-248619 A      10/2009

\* cited by examiner

*Primary Examiner* — Mahmoud Ismail
(74) *Attorney, Agent, or Firm* — Dinsmore & Shohl LLP

(57) ABSTRACT

When an engine start command is generated to an engine that is in a stopped state, engine start control for cranking the engine and starting fuel combustion after increasing the engine speed is performed. In the engine start control, one of a first start pattern in which an initial combustion speed is higher than a resonance speed of the engine, and a second start pattern in which the initial combustion speed is lower than the resonance speed of the engine is selected according to the speed ratio (gear position) of a transmission. Cranking (Continued)

torque in the second start pattern is lower than the cranking torque in the first start pattern.

5 Claims, 10 Drawing Sheets

(51) Int. Cl.
*B60K 6/36* (2007.10)
*B60K 6/54* (2007.10)
*B60W 20/30* (2016.01)
*B60W 10/10* (2012.01)
*B60K 6/365* (2007.10)
*B60K 6/445* (2007.10)
*B60K 6/547* (2007.10)
*F16H 3/66* (2006.01)
*F16H 3/72* (2006.01)
*G06F 19/00* (2011.01)

FIG.4

|      | C1  | C2  | C3  | B1  | B2  | F1  |
|------|-----|-----|-----|-----|-----|-----|
| 1st  | ○   |     |     |     | (○) | △   |
| 2nd  | ○   |     |     | ○   |     |     |
| 3rd  | ○   | ○   |     |     |     |     |
| 4th  |     | ○   |     | ○   |     |     |
| R    |     |     | ○   |     | ○   |     |
| N    |     |     |     |     |     |     |

○ : ENGAGED (○) : ENGAGED WHEN ENGINE BRAKE IS APPLIED

△ : ENGAGED ONLY DURING DRIVING

F I G . 10

| GEAR POSITION (SPEED RATIO) | TORQUE PATTERN | (INITIAL COMBUSTION SPEED) | |
|---|---|---|---|
| 1st | Ts1 | (Ns1) | START PATTERN(#1) |
| 2nd | Ts2 | (Ns2) | |
| 3rd | Ts3 | (Ns3) | START PATTERN(#2) |
| 4th | Ts4 | (Ns4) | |

HYBRID VEHICLE

INCORPORATION BY REFERENCE

The disclosure of Japanese Patent Application No. 2014-148931 filed on Jul. 22, 2014 including the specification, drawings and abstract is incorporated herein by reference in its entirety.

BACKGROUND OF THE INVENTION

1. Field of the Invention

The invention relates to a hybrid vehicle, and more particularly to control performed when an engine that is in a stopped state is started.

2. Description of Related Art

In a hybrid vehicle, the engine is intermittently operated according to running conditions of the vehicle, so that the engine is prevented from operating in a low efficiency region, for improvement of fuel economy. Accordingly, in the hybrid vehicle, the engine is automatically stopped and started during operation, resulting in increase of the frequency with which the engine is started. This makes it important to suppress vibration when the engine is started.

As a technology for suppressing vibration at the start of the engine, it is described in Japanese Patent Application Publication No. 2009-248619 (JP 2009-248619 A) to control cranking torque of a motor-generator that starts the engine by motoring, so that the engine speed promptly exceeds the resonance speed at which resonance occurs to the vehicle, when the engine is started.

In particular, in a hybrid vehicle having a power transmission mechanism including a transmission, the resonance speed changes according to the speed ratio of the transmission; therefore, control for increasing cranking torque is performed when the speed ratio is that of a high-speed gear position in which the resonance speed is increased, as described in JP 2009-248619 A.

SUMMARY OF THE INVENTION

However, in the control described in JP 2009-248619 A, when the speed ratio is that of the high-speed gear position in which the resonance speed is increased, output electric power from a power supply (typically, a battery) of an electric motor for starting the engine is increased, due to the increase of the cranking torque.

Therefore, under a situation where the output power from the power supply is reduced, such as when the temperature is low or the amount of charge is reduced, it is difficult to ensure sufficient cranking torque, and the vibration suppression effect at the start of the engine may be deteriorated or reduced. Also, if the cranking torque is set to a large value, care needs to be taken to prevent the engine speed from excessively increasing; therefore, control may become difficult in view of the compatibility with the driver's feeling.

This invention has been developed in view of the above problems, and the invention provides a hybrid vehicle having a drive system including a transmission, in which vibration at the start of an engine is appropriately suppressed in accordance with change of the speed ratio of the transmission.

According to one aspect of the invention, a hybrid vehicle including an engine, an electric motor, a power transmission mechanism, and an electronic control unit is provided. The electric motor is configured to apply cranking torque to the engine when the engine is started. The power transmission mechanism includes a transmission. The power transmission mechanism is provided between a rotary shaft of the engine and drive wheels. The power transmission mechanism includes a machine vibration system having a resonance frequency that changes according to a speed ratio of the transmission. The electronic control unit is configured to: (i) control each operation of the engine, the electric motor and the transmission, (ii) generate a command to set the speed ratio of the transmission, and (iii) change the cranking torque according to the speed ratio at a time when the engine that is in a stopped state is started, so as to reduce the cranking torque when the speed ratio at which the resonance frequency is equal to or lower than a predetermined resonance frequency is provided, as compared a time when the speed ratio at which the resonance frequency is higher than the predetermined resonance frequency is provided.

According to the hybrid vehicle as described above, which is constructed such that the resonance frequency of a drive system (power transmission mechanism) changes according to the speed ratio of the transmission, the engine starts in a start pattern according to which the cranking torque is reduced when the speed ratio (gear position) at which the resonance frequency is high is provided, so that the engine speed overpasses the resonance speed, by use of engine torque produced by fuel combustion. Thus, even when the output of a power supply of the electric motor is reduced, a sufficient effect of suppressing vibration at the start of the engine can be assured. Consequently, vibration at the start of the engine can be appropriately suppressed in accordance with change of the speed ratio.

In the hybrid vehicle as described above, the electronic control unit may be configured to select one of a first start pattern and a second start pattern when the engine that is in the stopped state is started. In the first start pattern, the electronic control unit may be configured to set an initial combustion speed as a rotational speed of the engine when fuel combustion is started in the engine after the cranking torque is generated, to be higher than a resonance speed as the rotational speed of the engine corresponding to the resonance frequency. In the second start pattern, the electronic control unit may be configured to set the initial combustion speed to be lower than the resonance speed, and reduce the cranking torque to be smaller than that of the first start pattern. The resonance speed at the speed ratio at which the first start pattern is selected may be lower than the resonance speed at the speed ratio at which the second start pattern is selected.

According to the hybrid vehicle as described above, the start pattern in which the engine speed overpasses the resonance speed by use of cranking torque, and the starting pattern in which the engine speed overpasses the resonance speed by use of engine torque, are selectively used, according to the speed ratio (gear position), so that vibration at the start of the engine can be appropriately suppressed. More specifically, when the speed ratio at which the resonance speed of the engine is low is provided, the engine speed can promptly overpass the resonance speed by use of cranking torque, without increasing the cranking torque so much. On the other hand, when the speed ratio at which the resonance speed of the engine is high is provided, the start pattern in which the initial combustion speed is set to be lower than the resonance speed and the cranking torque is reduced is selected, so that the engine speed can promptly overpass the resonance speed, by use of engine torque produced after the initial combustion. Namely, vibration at the start of the engine can be appropriately suppressed, in accordance with the speed ratio.

In the hybrid vehicle as described above, the speed ratio at which the first start pattern is selected may be higher than the speed ratio at which the second start pattern is selected.

Thus, in the above-described hybrid vehicle installed with the power transmission mechanism having frequency characteristics with which the resonance speed is higher as the speed ratio for higher speed is established, vibration at the start of the engine can be suppressed in accordance with change of the speed ratio.

According to this invention, in the hybrid vehicle having the power transmission mechanism including the transmission, vibration at the start of the engine can be appropriately suppressed in accordance with change of the speed ratio.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view showing an engagement operation table of the speed changing unit shown in FIG. 3;

FIG. 10 is a table useful for explaining another example of setting of an engine start pattern.

DETAILED DESCRIPTION OF EMBODIMENTS

Figure 1:
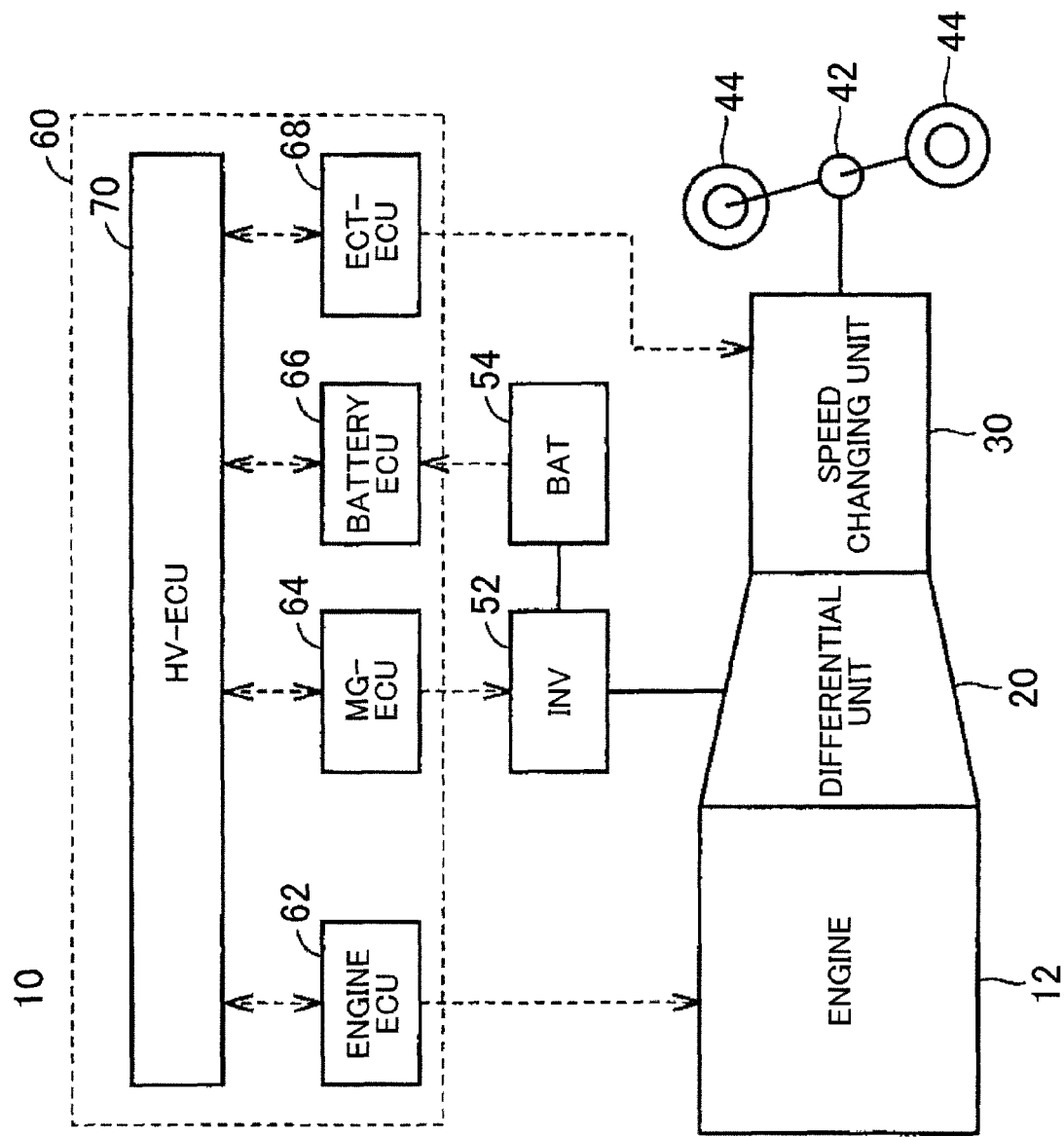
FIG. 1 is a view showing the overall configuration of a hybrid vehicle according to one embodiment of the invention.

One embodiment of the invention will be described in detail with reference to the drawings. In the drawings, the same reference numerals are assigned to the same or corresponding portions or elements, of which explanation will not be repeated in principle.

The overall configuration of a hybrid vehicle will be described. FIG. 1 shows the overall configuration of a hybrid vehicle 10 according to one embodiment of this invention. Referring to FIG. 1, the hybrid vehicle 10 includes an engine 12, a differential unit 20, a speed changing unit 30, a differential gear device 42, and drive wheels 44. The hybrid vehicle 10 further includes an inverter 52, a power storage device 54, and a controller 60.

The engine 12 is an internal combustion engine, such as a gasoline engine or a diesel engine. The engine 12 converts thermal energy produced by combustion of fuel into kinetic energy of a moving object, such as a piston or a rotor, and generates the kinetic energy resulting from the conversion to the differential unit 20. For example, the kinetic energy of a rotary shaft of the engine 12 is transmitted to the differential unit 20.

The differential unit 20 is coupled to the engine 12. The differential unit 20 includes motor-generators driven by the inverter 52, and a power split device that distributes the output of the engine 12 to a transmission member connected to the speed changing unit 30, and one of the motor-generators, as described later. The arrangement of the differential unit 20 will be described later.

The speed changing unit 30 is coupled to the differential unit 20, and is arranged to be able to change the ratio (speed ratio) of the rotational speed of the transmission member (an input shaft of the speed changing unit 30) connected to the differential unit 20 and the rotational speed of a drive shaft (an output shaft of the speed changing unit 30) connected to the differential gear device 42. In this embodiment, the speed changing unit 30 consists of a stepwise variable transmission of which the speed ratio can be changed in a stepwise fashion. However, the speed changing unit 30 may consist of a continuously variable transmission. The differential gear device 42 is coupled to the output shaft of the speed changing unit 30, and transmits power delivered from the speed changing unit 30 to the drive wheels 44. The arrangement of the speed changing unit 30 will also be described later, along with the differential unit 20.

The inverter 52 is electrically connected to the power storage device 54, and drives the motor-generators included in the differential unit 20, based on a control signal from the controller 60. The inverter 52 consists of bridge circuits each including power semiconductor switching devices for three phases, for example. Although not particularly illustrated, a voltage converter may be provided between the inverter 52 and the power storage device 54.

The power storage device 54 is a rechargeable DC power supply, and typically consists of a battery, such as a lithium-ion battery or a nickel hydride battery. The power storage device 54 stores electric power including power for running the vehicle, and supplies the power thus stored to the inverter 52. Also, the power storage device 54 receives electric power generated by the motor-generator of the differential unit 20 from the inverter 52, so as to be charged. The power storage device 54 may also consist of a power storage element, such as an electric double layer capacitor, other than the battery.

The controller (electronic control unit) 60 includes an engine ECU (Electronic Control Unit) 62, MG-ECU 64, battery ECU 66, ECT-ECU 68, and an HV-ECU 70. Each of the ECUs includes a CPU (Central Processing Unit), a storage device, an input/output buffer, etc. (all of which are not shown), and performs various controls which will be described later. The control performed by each ECU is not limited to processing by software, but may be processing by an exclusive hardware (electronic circuit). While the controller 60 consists of the above-indicated ECUs in this embodiment, the controller 60 may consist of a single ECU.

The engine ECU 62 produces a throttle signal, ignition signal, fuel injection signal, etc. for driving the engine 12, based on an engine torque command, etc.

received from the HV-ECU 70, and outputs the signals thus produced to the engine 12. The MG-ECU 64 produces a control signal for controlling the inverter 52, based on a command from the HV-ECU 70, and outputs the control signal thus produced to the inverter 52.

The battery ECU 66 estimates the state of charge (which is also called "SOC", and represented by a percentage of 0 to 100% where the fully charged state is represented by 100%) of the power storage device 54, based on the voltage and current of the power storage device 54 detected by a voltage sensor and a current sensor (not shown), and outputs the result of estimation to the HV-ECU 70. The ECT-ECU 68 produces a hydraulic command for controlling the speed changing unit 30, based on a torque capacity command, etc. received from the HV-ECU 70, and outputs the hydraulic command thus produced to the speed changing unit 30.

The HV-ECU 70 receives detected signals of various sensors, and produces various commands for controlling each device of the hybrid vehicle 10. As one of main controls performed by the HV-ECU 70, the HV-ECU 70 controls running of the hybrid vehicle 10, by suitably selecting one of "EV running mode" in which the vehicle runs using only the motor-generator as a power source while the engine 12 is stopped, and "HV running mode" in which the vehicle runs in a condition where the engine 12 is operated, according to running conditions (such as the amount of operation of the accelerator pedal, the vehicle speed, etc.) of the vehicle.

For example, the HV-ECU 70 selects the EV running mode in which the engine 12 is stopped, in a region (low-speed, light-load running) in which vehicle running power that varies according to running conditions is small. On the other hand, the HV-ECU 70 selects the HV running mode in which the engine 12 is operated, in a region (acceleration, high-speed running) in which the vehicle running power is large. Namely, during driving of the hybrid vehicle 10, stopping of the engine 12 that is in operation and starting of the engine 12 that is in a stopped state are automatically repeated. Namely, the engine 12 is intermittently operated according to running conditions.

Further, in running control, the HV-ECU 70 controls the engine 12, differential unit 20 and the speed changing unit 30 into desired conditions, based on running conditions. Also, the HV-ECU 70 performs shift control for controlling the behaviors of the engine 12 and the differential unit 20 to desired targets, during shifting of the speed changing unit 30.

Figure 2:
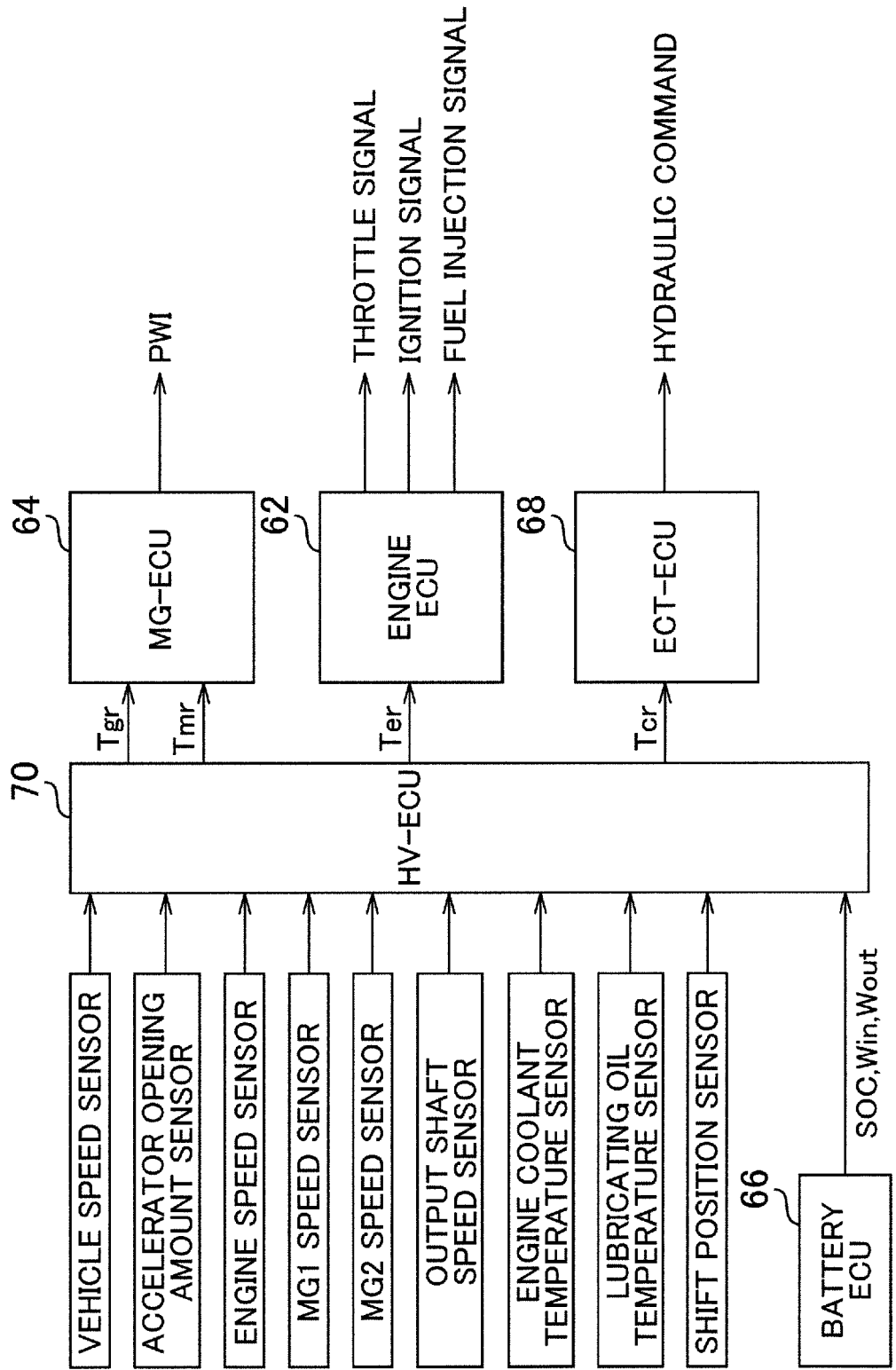
FIG. 2 is a view showing main signals transmitted to and received from a controller shown in FIG. 1.

FIG. 2 is a view showing main signals and commands received by and generated from the controller 60 shown in FIG. 1. Referring to FIG. 2, the HV-ECU 70 receives a signal from a vehicle speed sensor that detects the speed of the hybrid vehicle 10, a signal from an accelerator opening amount sensor that detects the amount of operation of the accelerator pedal, and a signal from an engine speed sensor that detects the rotational speed of the engine 12. Also, the HV-ECU 70 further receives a signal from an MG1 speed sensor for detecting the rotational speed of a motor-generator MG1 (which will be described later) included in the differential unit 20, a signal from an MG2 speed sensor for detecting the rotational speed of a motor-generator MG2 (which will be described later) included in the differential unit 20, and a signal from an output shaft speed sensor for detecting the rotational speed of the output shaft of the speed changing unit 30.

Further, the HV-ECU 70 receives a signal from a lubricating oil temperature sensor that detects the temperature of lubricating oil of the differential unit 20 and the speed changing unit 30, a signal from a shift position sensor that detects a shift position selected with a shift lever, and a signal from a water temperature sensor that detects the temperature of engine coolant. Further, the HV-ECU 70 receives a signal indicative of the SOC of the power storage device 54, a signal indicative of permissible charge power Win indicating the upper limit of the charge power of the power storage device 54, a signal indicative of permissible discharge power Wout indicating the upper limit of the discharge power of the power storage device 54, etc., from the battery ECU 66.

The battery ECU 66 holds down the permissible discharge power Wout so as to restrict discharge power, when the SOC of the power storage device 54 is low or the temperature is low or high. Similarly, the battery ECU 66 holds down the permissible charge power Win so as to restrict charge power, when the SOC is high or the temperature is low or high.

The HV-ECU 70 performs running control according to running conditions (e.g., the amount of operation of the accelerator pedal and the vehicle speed), so as to control output distribution among the engine 12 and the motor-generators MG1, MG2, in view of the energy efficiency of the vehicle. The above-described intermittent operation of the engine 12 is carried out according to the output distribution control.

The HV-ECU 70 produces an engine torque command Ter indicative of a target value of output torque of the engine 12, torque commands Tgr, Tmr for driving the motor-generators MG1, MG2 of the differential unit 20, and a torque capacity command Tcr for controlling the speed changing unit 30, according to the running control (output distribution control). For example, the HV-ECU 70 determines the gear position of the speed changing unit 30 according to a predetermined shift map, and produces the torque capacity command Tcr for establishing the gear position.

The engine ECU 62 that receives the engine torque command Ter produces the throttle signal, ignition signal, fuel injection signal etc. for driving the engine 12, and outputs the signals to the engine 12. When the engine 12 is stopped, Ter is set to 0, so that fuel injection and ignition are stopped in the engine 12, and fuel combustion can be stopped. In another example, a signal that calls for stop/execution of fuel combustion in the engine 12 may be provided, independently of the engine torque command Ter.

The MG-ECU 64 that receives the torque commands Tgr, Tmr produces a signal PWI for driving the inverter 52 so that the motor-generators MG1, MG2 produce torque corresponding to the torque commands Tgr, Tmr, and outputs the signal PWI thus produced to the inverter 52. The torque commands Tgr, Tmr are limited so that the sum of electric power (rotational speed x torque) received by or generated from the motor-generators MG1, MG2 falls within the range of the above-indicated Win to Wout. Accordingly, the torque commands Tgr, Tmr can be limited, depending on the SOC and temperature of the power storage device 54.

The ECT-ECU 68 that receives the torque capacity command Tcr produces a hydraulic command that causes the speed changing unit 30 to have a torque capacity corresponding to the torque capacity command Tcr, and outputs the hydraulic command thus produced to the speed changing unit 30.

Figure 3:
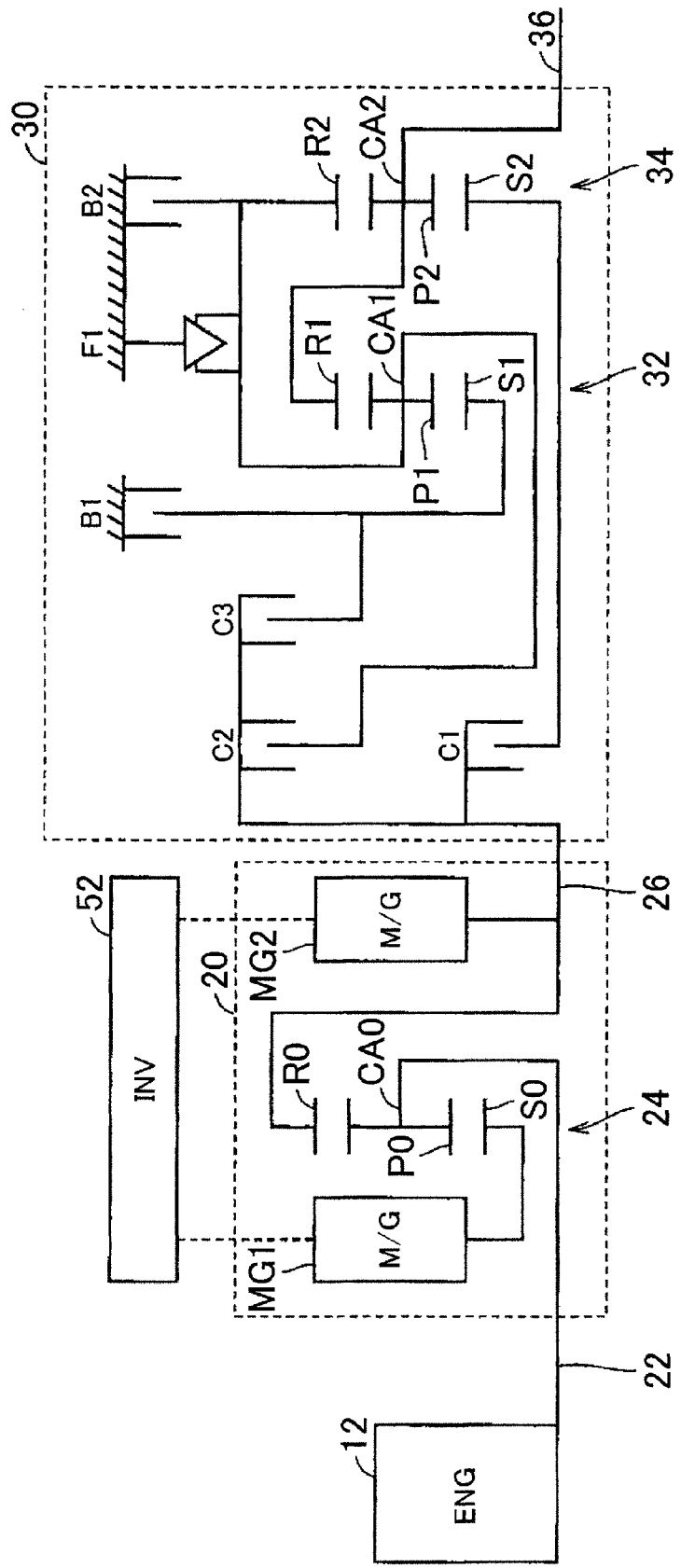
FIG. 3 is a view showing the configuration of a differential unit and a speed changing unit shown in FIG. 1.

Next, the configuration of the differential unit and the speed changing unit will be described. FIG. 3 shows the configuration of the differential unit 20 and the speed changing unit 30 shown in FIG. 1. In this embodiment, the differential unit 20 and the speed changing unit 30 are configured or arranged symmetrically with respect to the axis hereof; therefore, the lower halves of the differential unit 20 and speed changing unit 30 are not illustrated in FIG. 3.

Referring to FIG. 3, the differential unit 20 includes the motor-generators MG1, MG2, and the power split device 24. Each of the motor-generators MG1, MG2 is an AC electric motor, which is, for example, a permanent magnet type synchronous electric motor having a rotor in which permanent magnets are embedded. The motor-generators MG1, MG2 are driven by the inverter 52.

The power split device 24 consists of a single-pinion-type planetary gear set, and includes a sun gear S0, pinions P0, a carrier CA0, and a ring gear R0. The carrier CA0 is coupled to the input shaft 22, or the output shaft of the engine 12, and supports the pinions P0 such that the pinions P0 can rotate about themselves and about the axis of the planetary gear set. The sun gear S0 is coupled to a rotary shaft of the motor-generator MG1. The ring gear R0 is coupled to the transmission member 26, and is configured to mesh with the sun gear S0 via the pinions P0. A rotary shaft of the motor-generator MG2 is coupled to the transmission member 26. Namely, the ring gear R0 is also coupled to the rotary shaft of the motor-generator MG2.

The power split device 24 functions as a differential device when the sun gear S0, carrier CA0 and the ring gear R0 rotate relative to each other. The respective rotational speeds of the sun gear S0, carrier CA0 and the ring gear R0 have a relationship as shown in a nomographic chart (FIG. 5) and described later, in which these speeds are connected with a straight line. Owing to the differential function of the power split device 24, power generated from the engine 12 is distributed to the sun gear S0 and the ring gear R0. Then, the motor-generator MG1 operates as a generator, using the power distributed to the sun gear S0, and electric power generated by the motor-generator MG1 is supplied to the motor-generator MG2, or stored in the power storage device 54 (FIG. 1).

The output torque of the motor-generator MG1 may be used for giving rotative force for acceleration or deceleration to the output shaft of the engine 12. Accordingly, when the engine 12 that is in a stopped state is started, engine start control is performed so as to start fuel injection and ignition (namely, fuel combustion) in the engine 12, after applying cranking torque from the motor-generator MG1 to the engine 12, and increasing the engine speed. Namely, when starting the engine, the HV-ECU 70 sets the torque command Tgr of the motor-generator MG1, according to the engine start control.

The speed changing unit 30 includes single-pinion-type planetary gear sets 32, 34, clutches C1-C3, brakes B1, B2, and a one-way clutch F1. The planetary gear set 32 includes a sun gear S1, pinions P1, a carrier CA1, and a ring gear R1. The planetary gear set 34 includes a sun gear S2, pinions P2, a carrier CA2, and a ring gear R2.

Each of the clutches C1-C3 and the brakes B1, B2 is a friction engagement device that is hydraulically operated, and consists of a wet multiple disc clutch or brake having a plurality of stacked sheets of friction plates that are hydraulically pressed, or a band brake that has a band wound around an outer circumferential surface of a rotating drum and is operable when one end of the band is hydraulically pulled tightly, or the like. The one-way clutch F1 supports the carrier CA1 and the ring gear R2 coupled to each other so as to permit them to rotate in one direction and inhibit them from rotating in the other direction.

In the speed changing unit 30, each of the clutches C1-C3, brakes B1, B2 and the one-way clutch F1 is selectively engaged or released, according to the engagement operation table shown in FIG. 4, so that a selected one of the 1st-speed gear position through 4th-speed gear position and a reverse-drive gear position is provided. In FIG. 4, "O" indicates that the engagement device in question is in the engaged state, and "(O)" indicates that the engagement device is engaged when engine brake is applied, while "Δ" indicates that the engagement device is engaged only when the vehicle is driven, and blank indicates that the engagement device is in the released state. When all of the engagement devices of the clutches C1-C3 and brakes B1, B2 are placed in the released states, a neutral condition (a condition in which power transmission is cut off) can be provided.

Referring again to FIG. 3, the differential unit 20 and the speed changing unit 30 are coupled to each other via the transmission member 26. The output shaft 36 coupled to the carrier CA2 of the planetary gear set 34 is coupled to the differential gear device 42 (FIG. 1).

Figure 5:
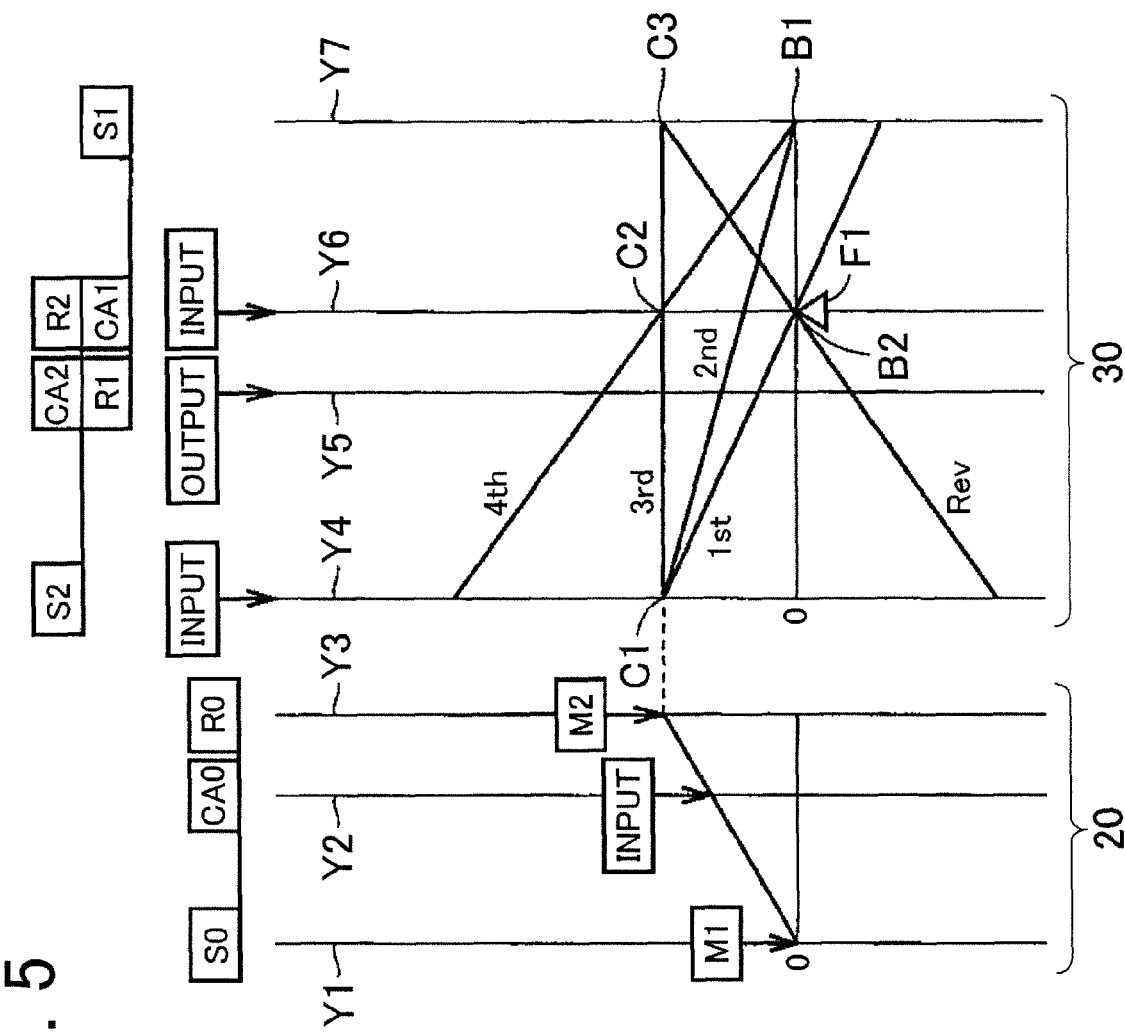
FIG. 5 is a nomographic chart of a shift mechanism constituted by the differential unit and the speed changing unit shown in FIG. 1.

FIG. 5 is a nomographic chart of a shift mechanism constituted by the differential unit 20 and the speed changing unit 30. Referring to FIG. 3 as well as FIG. 5, vertical line Y1 of the nomographic chart corresponding to the differential unit 20 indicates the rotational speed of the sun gear S0 of the power split device 24, namely, the rotational speed of the motor-generator MG1. Vertical line Y2 indicates the rotational speed of the carrier CA0 of the power split device 24, namely, the rotational speed of the engine 12. Vertical line Y3 indicates the rotational speed of the ring gear R0 of the power split device 24, namely, the rotational speed of the motor-generator MG2. The intervals between the vertical lines Y1-Y3 are determined according to the gear ratio of the power split device 24.

Also, vertical line Y4 of the nomographic chart corresponding to the speed changing unit 30 indicates the rotational speed of the sun gear S2 of the planetary gear set 34, and vertical line Y5 indicates the rotational speed of the carrier CA2 of the planetary gear set 34 and the ring gear R1 of the planetary gear set 32 which are coupled to each other. Also, vertical line Y6 indicates the rotational speed of the ring gear R2 of the planetary gear set 34 and the rotational speed of the carrier CA1 of the planetary gear set 32 which are coupled to each other, and vertical line Y7 indicates the rotational speed of the sun gear S1 of the planetary gear set 32. The intervals of the vertical lines Y4 to Y7 are determined according to the gear ratios of the planetary gear sets 32, 34.

If the clutch C1 is engaged, the sun gear S2 of the planetary gear set 34 is coupled to the ring gear R0 of the differential unit 20, and the sun gear S2 and the ring gear R0 rotate at the same speed. If the clutch C2 is engaged, the carrier CA1 of the planetary gear set 32 and the ring gear R2 of the planetary gear set 34 are coupled to the ring gear R0, and the carrier CA1 and the ring gear R2 rotate at the same speed as the ring gear R0. If the clutch C3 is engaged, the sun gear S1 of the planetary gear set 32 is coupled to the ring gear R0, and the sun gear S1 and the ring gear R0 rotate at the same speed. If the brake B1 is engaged, rotation of the sun gear S1 is stopped. If the brake B2 is engaged, rotation of the carrier CA1 and the ring gear R2 is stopped.

For example, as indicated in the engagement operation table of FIG. 4, if the clutch C1 and the brake B1 are engaged, and the remaining clutches and brake are released, a straight line labelled "2nd" is provided in the nomographic chart of the speed changing unit 30. The vertical line Y5 indicating the rotational speed of the carrier CA2 of the planetary gear set 34 indicates the output rotational speed of the speed changing unit 30 (the rotational speed of the output shaft 36). Thus, in the speed changing unit 30, the clutches C1-C3 and the brakes B1, B2 are engaged or released according to the engagement operation table of FIG. 4, so that a selected one of the 1st-speed gear position to the 4th-speed gear position, reverse-drive gear position, and the neutral condition can be provided.

Thus, in the hybrid vehicle 10 according to this embodiment, the speed changing unit 30 is included in a power transmission pathway from the rotary shaft of the engine 12 to the drive wheels 44.

Generally, in a drive system of a vehicle, a machine vibration system is provided by a power transmission mechanism. It is known that, in the machine vibration system, a resonance phenomenon is caused to occur in response to vibration of its natural frequency (resonance frequency). When the engine speed is equal to a particular speed (which will also be called "resonance speed") corresponding to the resonance frequency, vehicle vibrations may take place due to the resonance phenomenon.

The resonance frequency of the machine vibration system is a specific value determined by the shape and mass (moment) of hardware. Accordingly, as described in JP 2009-248619 A, in the arrangement in which a transmission is included in a power transmission pathway, if the gear ratio (speed ratio) provided by the transmission is changed, the states (engaged/released states) of clutches and brakes are changed, whereby the moment of inertia on the rotary shaft changes, and the resonance frequency tends to change.

Figure 6:
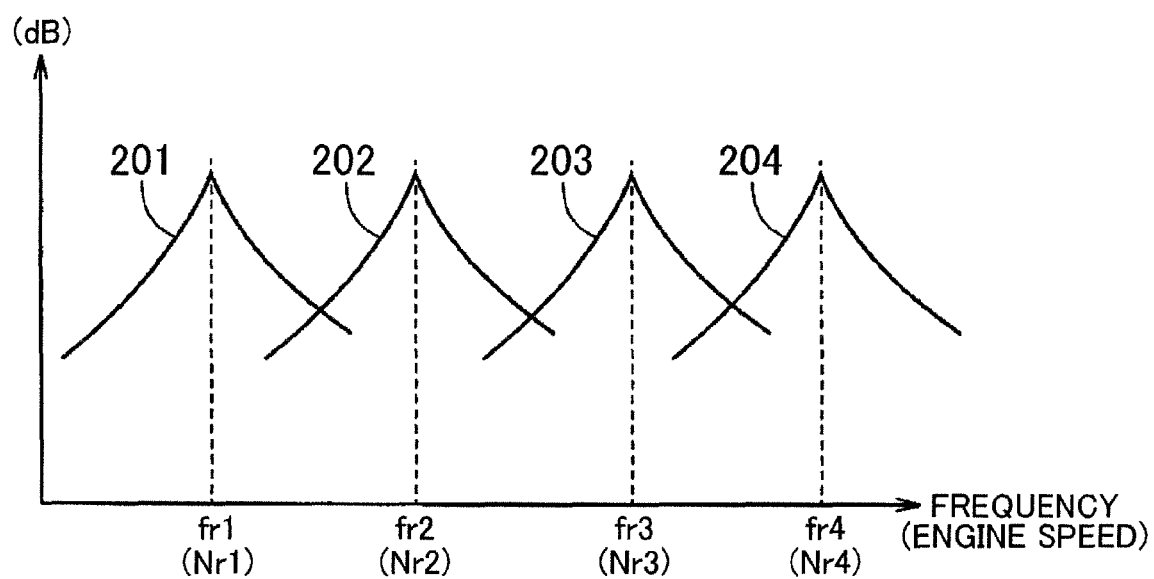
FIG. 6 is a conceptual view useful for explaining an example of change of the resonance frequency (engine speed at which resonance occurs to the vehicle) relative to the speed ratio (gear position) of a transmission.

FIG. 6 is a conceptual diagram useful for explaining an example of change of the resonance frequency relative to the speed ratio (gear position) of the speed changing unit 30. In FIG. 6, the horizontal axis indicates the frequency of vibration applied to the machine vibration system, and the vertical axis indicates the degree (dB) of amplification of the vibration.

Referring to FIG. 6, characteristic lines 201-204 schematically indicate frequency characteristics in the 1st-speed, 2nd-speed, 3rd-speed and 4th-speed gear positions, respectively, shown in FIG. 4. The resonance frequency of the power transmission mechanism (drive system) is fr1 when the 1st-speed gear position is provided, fr2 when the 2nd-speed gear position is provided, fr3 when the 3rd-speed gear position is provided, and is fr4 when the 4th-speed gear position is provided. In the following description, the engine speeds (resonance speeds) corresponding to the resonance frequencies fr1-fr4, respectively, will be denoted as Nr1-Nr4. While the frequency characteristics of the drive system of the hybrid vehicle 10 can take various patterns depending on its structure, the following description will be based on the assumption that the drive system of the hybrid vehicle 10 has the frequency characteristics as shown in FIG. 6.

As is understood from FIG. 6, if the gear position (speed ratio) provided by the speed changing unit 30 changes, the resonance speed of the engine 12 also changes. In the hybrid vehicle 10 in which the engine 12 is automatically intermittently operated, the engine starts with increased frequency, and the speed ratio (gear position) of the speed changing unit 30 at the start of the engine is not fixed; therefore, it is important to perform engine start control for suppressing vibration at the start of the engine 12 in accordance with the speed ratio (gear position).

In the engine start control described in JP 2009-248619 A, when a gear position in which the resonance speed is high is provided, vibration is suppressed by increasing cranking torque. However, under the engine start control, the cranking torque is limited when the output of the battery is low (e.g., when the battery has a low temperature or low SOC), which may result in insufficient suppression of vibration.

Accordingly, in engine start control applied to the hybrid vehicle according to this embodiment, cranking torque is changed in accordance with change of the gear position (speed ratio), so as to switch a control pattern (which will also be called "engine start pattern") of the engine speed at the start of the engine, for promptly crossing or passing over a resonance speed zone of the engine 12.

Figure 7:
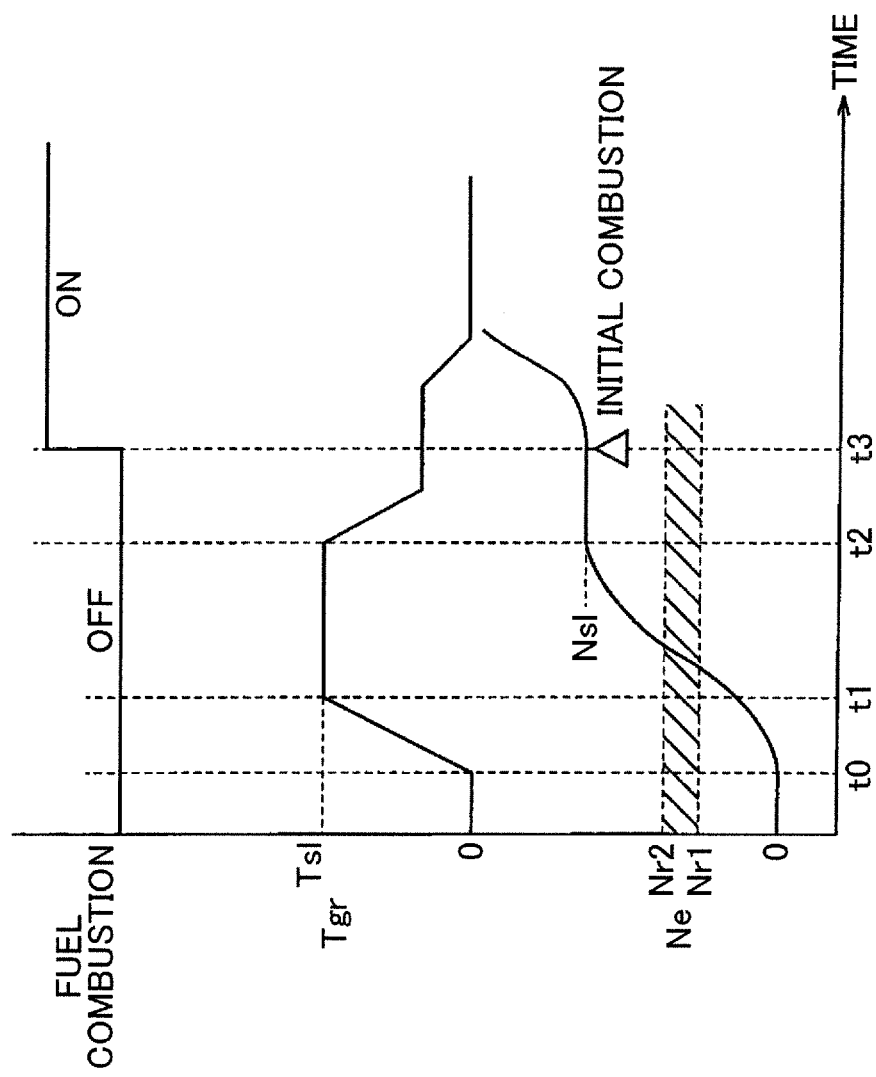
FIG. 7 is a conceptual waveform diagram useful for explaining an engine start pattern at the time when a gear position (speed ratio) in which the resonance speed is low is provided.

FIG. 7 is a conceptual waveform diagram useful for explaining an engine start pattern used when a gear position (speed ratio) in which the resonance speed is low is provided. For example, the engine start pattern of FIG. 7 is used when the speed changing unit 30 provides the 1st-speed gear position or the 2nd-speed gear position (which will be comprehensively called "LOW gear"). The LOW gear means a gear position having a large speed ratio (reduction ratio) for low speed.

Referring to FIG. 7, prior to time t0, the engine 12 is in a stopped state. Namely, the engine speed Ne is equal to 0, and fuel injection and ignition are stopped in the engine 12, in other words, fuel combustion is OFF.

If a start command is generated at time t0 to the engine 12 that is in the stopped state, a torque command Tgr of the motor-generator MG1 is set, according to a predetermined torque pattern, so as to cause the motor-generator MG1 to crank the engine 12. For example, the torque command Tgr is increased up to a command value Ts1 of cranking torque at a fixed rate (time t0-t1), and is kept at Ts1 for a fixed period (time t1-t2).

With the cranking torque thus applied to the engine 12, the engine speed Ne increases. In the engine start pattern of FIG. 7, the engine speed Ne passes a frequency range including the resonance speeds Nr1, Nr2, under a condition where fuel combustion is OFF, namely, where no fuel combustion takes place in the engine 12.

The cranking torque starts being reduced at time t2, so that the engine speed Ne is kept at the same value (Ne=Ns1). In this condition, fuel injection is started in the engine 12, and ignition is carried out for the first time (namely, initial combustion takes place) at time t3. As a result, fuel combustion is started in the engine 12. With engine torque produced by fuel combustion, the engine speed Ne increases to a higher value than the initial combustion speed. Then, the engine start control is finished.

In the start pattern of FIG. 7, the engine speed Ne (the initial combustion speed) at the time when the initial combustion takes place in the engine 12 is equal to Ns1, which is higher than the resonance speeds Nr1, Nr2. Accordingly, the engine speed Ne passes the frequency range including the resonance speeds Nr1, Nr2, by use of accelerating force produced by cranking torque. Thus, the command value Ts1 of cranking torque needs to be set so that the engine speed Ne can promptly overpass the resonance speeds Ns1, Ns2. It is, however, to be noted that the start pattern of FIG. 7 is employed when a gear position (speed ratio) in which the resonance speed is low is provided; therefore, the engine speed can promptly overpass the resonance frequency region even if the cranking torque is not set to such a large value.

Figure 8:
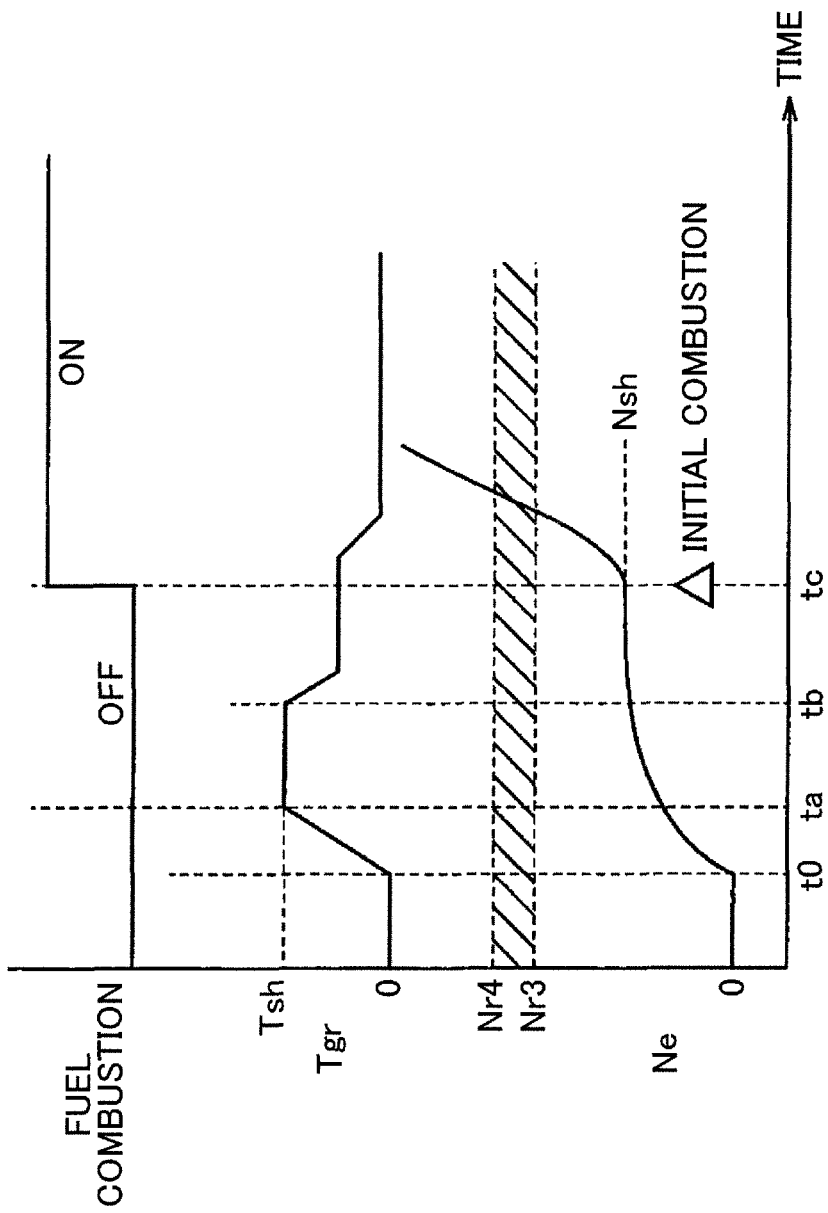
FIG. 8 is a conceptual waveform diagram useful for explaining an engine start pattern at the time when a gear position (speed ratio) in which the resonance speed is high is provided.

FIG. 8 is a conceptual waveform diagram useful for explaining an engine start pattern used when a gear position (speed ratio) in which the resonance speed is high is provided. For example, the engine start pattern of FIG. 8 is used when the speed changing unit 30 provides the 3rd-speed gear position or 4th-speed gear position (which will be comprehensively called "HIGH gear"). The HIGH gear means a gear position having a small speed ratio (reduction ratio) for high speed.

In FIG. 8, too, a start command is generated at time t0 to the engine 12 that is in the stopped state. The resonance speeds Nr3, Nr4 at the time when the HIGH gear is provided are higher than the resonance speeds Nr1, Nr2 (FIG. 7) at the time when the LOW gear is provided.

If the start command is generated (time t0), a torque command Tgr that causes the motor-generator MG1 to produce cranking torque is set, according to a predetermined torque pattern. The torque command Tgr is increased up to a command value Tsh of cranking torque at a fixed rate (time t0-ta), and is kept at Tsh for a fixed period (time ta-tb).

With the cranking torque thus applied to the engine 12, the engine speed Ne increases. Then, the cranking torque starts being reduced at time tb, so that the engine speed Ne is kept at the same value (Ne=Nsh). At this time, since the cranking torque is set to a relatively small value (Tsh<Ts1), the initial combustion speed Nsh is lower than the resonance speeds Nr3, Nr4 when the HIGH gear is provided.

Then, at time tc, the initial combustion takes place in the engine 12, and fuel combustion is started. The initial combustion speed Nsh is lower than the resonance speeds Nr3, Nr4 when the HIGH gear is provided. Accordingly, in the start pattern of FIG. 8, the engine speed Ne can promptly overpass a frequency range including the resonance speeds N3, Nr4, by use of torque produced by fuel combustion in the engine 12. The engine speed Ne further increases as the fuel combustion continues, and then, the engine start control is finished.

In the start pattern of FIG. 8, the cranking torque is set to a relatively small value (Tsh<Ts1); therefore, even in the case where a gear position (speed ratio) in which the resonance speed is high is provided, it is possible to suppress vibration at the start of the engine, without increasing cranking torque produced by the motor-generator MG1.

The initial combustion speeds Ns1 and Nsh in the respective start patterns generally have a relationship of Ns1>Nsh, according to the relationship in magnitude of the cranking torque.

Figure 9:
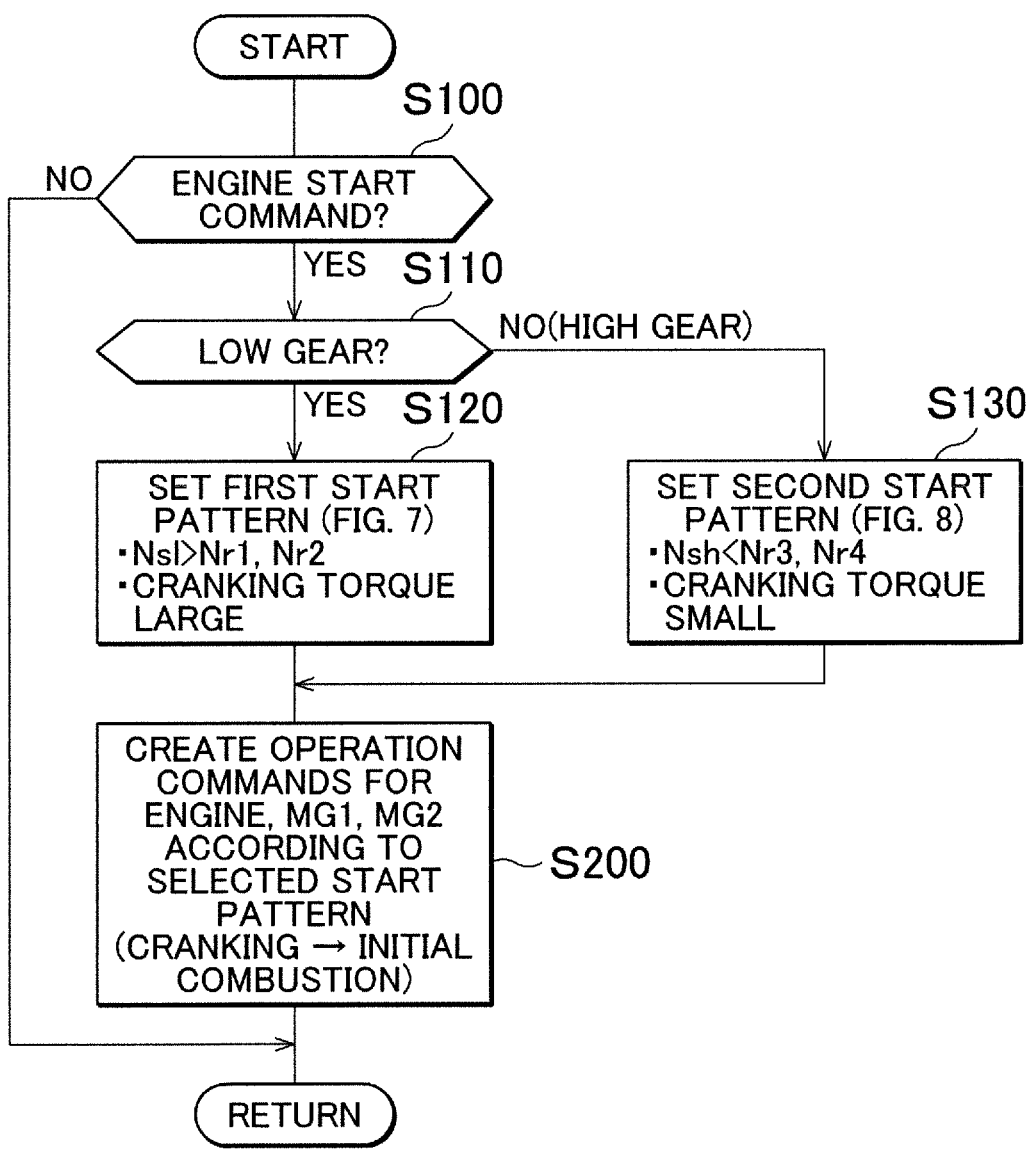
FIG. 9 is a flowchart illustrating a routine of engine start control in the hybrid vehicle according to the embodiment of the invention.

FIG. 9 is a flowchart illustrating engine start control for the hybrid vehicle according to this embodiment of the invention. A control routine illustrated in the flowchart of FIG. 9 is repeatedly executed when the engine 12 is in the stopped state. By executing the control routine according to the flowchart of FIG. 9, one of the engine start patterns shown in FIG. 7 and FIG. 8 is selectively implemented.

Referring to FIG. 9, the controller 60 (HV-ECU 70) determines in step S100 whether a condition or conditions under which an engine start command is generated is/are satisfied. For example, when vehicle running power is increased through depression of the accelerator pedal, or the like, while the engine 12 is in a stopped state, an affirmative decision (YES) is obtained in step S100.

If the engine start command is generated (when an affirmative decision (YES) is obtained in step S100), the controller 60 (HV-ECU 70) determines the speed ratio provided in the speed changing unit 30. For example, in step S110, it is determined whether a LOW gear (the 1st-speed gear or the 2nd-speed gear) for low speed is selected. When the LOW gear is provided (when an affirmative decision (YES) is obtained in step S110), the controller 60 (HV-ECU 70) proceeds to step S120, and sets cranking torque (Ts1), so as to start the engine 12 according to the first start pattern shown in FIG. 7. As a result, the initial combustion speed Ns1 becomes higher than the resonance speeds Nr1, Nr2 when the LOW gear is provided.

When the HIGH gear (the 3rd-speed gear or the 4th-speed gear) is provided (when a negative decision (NO) is obtained in step S110), on the other hand, the controller 60 (HV-ECU 70) proceeds to step S130, and sets cranking torque (Tsh) so as to perform engine start control according to the second start pattern shown in FIG. 8. The cranking torque Tsh in the second start pattern is lower than the cranking torque Ts1 in the first start pattern. The initial combustion speed Nsh is lower than the resonance speeds Nr3, Nr4 when the HIGH gear is provided.

Further, in step S200, the controller 60 (HV-ECU 70) creates an operation command (e.g., an engine torque command Ter) for the engine 12, and operation commands (e.g., torque commands Tgr, Tmr) for the motor-generators MG1, MG2, so that the engine 12 is started, according to the start pattern selected in step S120 or S130.

The engine ECU 62 and the MG-ECU 64 control the engine 12 and the motor-generators MG1, MG2, according to the operation commands from the HV-ECU 70. As a result, at the start of the engine 12, the engine start control for starting fuel combustion in the engine 12, after increasing the engine speed to the initial combustion speed by use of cranking torque, can be carried out according to the start pattern (FIG. 7, FIG. 8) selected according to the gear position (speed ratio) currently provided.

In the engine start control, the initial combustion speed may not be directly controlled. Namely, values (Ts1, Tsh) of cranking torque and patterns may be adjusted in advance, so that the initial combustion speed becomes equal to a desired speed, according to the result of experiments using an actual machine or simulation. In this embodiment, the initial combustion speed may be precisely controlled by controlling the engine speed in a feedback fashion during cranking, in view of the significance of the relationship in level between the initial combustion speed and the resonance speed. For example, the torque command Tgr of the motor-generator MG1 in a period of time t1 to t3 of FIG. 7 or a period of time ta to tc of FIG. 8 may be set through feedback control for making the engine speed equal to a desired initial combustion speed.

In the hybrid vehicle according to this embodiment, which is configured such that the resonance frequency of the drive system (power transmission mechanism) changes according to the gear position (speed ratio) of the speed changing unit 30, cranking torque is changed in accordance with change of the gear position (speed ratio). More specifically, in the start pattern used when a gear position (speed ratio) that provides a high resonance frequency is provided, cranking torque is reduced so that the engine speed overpasses the resonance speed by use of engine torque produced by fuel combustion. Therefore, even when the output of the battery that serves as a power supply for the motor-generator MG1 is low (when the SOC is low or the temperature is low), vibration can be suppressed at the start of the engine.

More specifically, the cranking torque is changed according to the gear position (speed ratio), so that the start pattern in which the engine speed overpasses the resonance speed by use of cranking torque, and the start pattern in which the engine speed overpasses the resonance speed by use of engine torque produced by fuel combustion, are selectively used depending on the gear position (speed ratio). In this manner, vibration can be appropriately suppressed at the start of the engine.

In the embodiment shown in FIG. 7 through FIG. 9, two types of the cranking torque (and the initial combustion speed) are set for the HIGH gear (the 3rd-speed gear or the 4th-speed gear) and the LOW gear (the 1st-speed gear or the 2nd-speed gear), respectively. However, in a modified example, the cranking torque (and the initial combustion speed) that varies for each gear position may be set.

For example, as shown in FIG. 10, engine start control may be carried out, so that cranking torques Ts1-Ts4 (and initial combustion speeds Ns1-Ns4) are set for the 1st-speed, 2nd-speed, 3rd-speed and 4th-speed gear positions, respectively.

In this modified example, too, the first start pattern shown in FIG. 7 is employed, for a part of the gear positions, depending on the cranking torque set for each gear position. In the first start pattern, the initial combustion speed is higher than the resonance speed when the gear position in question is provided. Also, the second start pattern shown in FIG. 8 in which the cranking torque is reduced is employed, for the remaining gear positions. In the second start pattern, the initial combustion speed is lower than the resonance speed when the gear position in question is provided.

While the speed changing unit consists of the stepwise variable transmission in the illustrated embodiment, this invention may be applied to the case where the speed changing unit consists of a continuously variable transmission, as long as the resonance frequency of the power transmission mechanism including the transmission changes according to the speed ratio. For example, engine start control may be similarly employed in which one of first and second start patterns having different cranking torques is selected based on the speed ratio at the start of the engine, in accordance with change of the resonance speed of the engine according to the speed ratio of the continuously variable transmission.

The configuration or arrangement of the drive system of the hybrid vehicle is not limited to the one illustrated in FIG. 1, but the engine start control according to this embodiment may be similarly applied to another type of drive system (power transmission system) provided that its resonance frequency changes according to change of the speed ratio (gear position) of the transmission.

According to frequency characteristics shown in this embodiment, the resonance frequency (resonance speed) is lower as the speed ratio is larger or the transmission is in a lower gear position for low speed, and the resonance frequency (resonance speed) is higher as the speed ratio is smaller or the transmission is in a higher gear position for high speed. However, the engine start control according to this embodiment is not limitedly applied to this example. Namely, the first and second start patterns may be selectively applied or used, in accordance with the level of the resonance speed of the engine, as long as a frequency characteristic that the resonance frequency (i.e., resonance speed of the engine) changes according to the speed ratio is grasped, so that similar effects can be provided.

It is to be understood that the embodiment disclosed herein is exemplary in all aspects, and not restrictive. The scope of the invention is not determined from the above description of the embodiment, but is defined by the appended claims, and is intended to include all changes within the scope of the invention defined by the claims and within the meaning and range of equivalents thereof.

What is claimed is:

1. A hybrid vehicle, comprising:
   an engine;
   an electric motor configured to apply cranking torque to the engine when the engine is started;
   a power transmission mechanism including a transmission, the power transmission mechanism being provided between a rotary shaft of the engine and drive wheels, and the power transmission mechanism including a machine vibration system having a resonance frequency that changes according to a speed ratio of the transmission; and
   an electronic control unit configured to:
   (i) control each operation of the engine, the electric motor and the transmission,
   (ii) generate a command to set the speed ratio of the transmission,
   (iii) set the cranking torque to a first cranking torque when the engine that is in a stopped state is started and the speed ratio of the transmission is a first speed ratio, and
   (iv) set the cranking torque to a second cranking torque when the engine that is in the stopped state is started and the speed ratio of the transmission is a second speed ratio, wherein the first speed ratio is lower than the second speed ratio and the first cranking torque is smaller than the second cranking torque, so as to increase the cranking torque when the speed ratio at which the resonance frequency is equal to or lower than a predetermined resonance frequency is provided, as compared to a time when the speed ratio at which the resonance frequency is higher than the predetermined resonance frequency is provided.

2. The hybrid vehicle according to claim 1, wherein the electronic control unit is configured to select one of a first start pattern and a second start pattern according to the speed ratio at the start of the engine when the engine that is in the stopped state is started,
   the first start pattern is provided in which an initial combustion speed as a rotational speed of the engine when fuel combustion is started in the engine after the cranking torque is generated is set to be higher than a resonance speed as the rotational speed of the engine corresponding to the resonance frequency,
   the second start pattern is provided in which the initial combustion speed is set to be lower than the resonance speed, and the cranking torque is reduced to be smaller than that of the first start pattern, and
   the resonance speed at the speed ratio at which the first start pattern is selected is lower than the resonance speed at the speed ratio at which the second start pattern is selected.

3. The hybrid vehicle according to claim 2, wherein the speed ratio at which the first start pattern is selected is higher than the speed ratio at which the second start pattern is selected.

4. A hybrid vehicle, comprising:
   an engine;
   an electric motor configured to apply cranking torque to the engine when the engine is started;
   a power transmission mechanism including a transmission, the power transmission mechanism being provided between a rotary shaft of the engine and drive wheels, and the power transmission mechanism including a machine vibration system having a resonance frequency that changes according to a speed ratio of the transmission; and
   an electronic control unit configured to:
   (i) control each operation of the engine, the electric motor and the transmission,
   (ii) generate a command to set the speed ratio of the transmission, and
   (iii) select one of a first start pattern and a second start pattern according to the speed ratio at the start of the engine when the engine that is in the stopped state is started, wherein:
   the first start pattern is provided in which an initial combustion speed as a rotational speed of the engine when fuel combustion is started in the engine after the cranking torque is generated is set to be higher than a resonance speed as the rotational speed of the engine corresponding to the resonance frequency, the second start pattern is provided in which the initial combustion speed is set to be lower than the resonance speed, and the cranking torque is reduced to be smaller than that of the first start pattern, and the resonance speed at the speed ratio at which the first start pattern is selected is lower than the resonance speed at the speed ratio at which the second start pattern is selected.

5. The hybrid vehicle according to claim 4, wherein
the speed ratio at which the first start pattern is selected is higher than the speed ratio at which the second start pattern is selected.

\* \* \* \* \*